United States Patent Office 3,743,730
Patented July 3, 1973

3,743,730
METHOD OF INDUCING LABOR AND PARTURITION IN ANIMALS
William M. Adams, Ames, Iowa, assignor to Iowa State University Research Foundation, Inc., Ames, Iowa
No Drawing. Continuation of abandoned application Ser. No. 14,649, Feb. 26, 1970. This application June 23, 1971, Ser. No. 156,130
Int. Cl. A61k 17/00
U.S. Cl. 424—243                    4 Claims

ABSTRACT OF THE DISCLOSURE

This invention relates to a method for inducing labor and parturition in term or near term animals by treating the animals with a labor and parturition inducing quantity of a corticosteroid.

BACKGROUND OF THE INVENTION

This invention relates to a method for inducing labor and parturition in term and near term animals. This application is a continuation of S.N. 14,649 filed Feb. 26, 1970, now abandoned.

Interruption of pregnancy in animals is often recommended in veterinary medicine. Common reasons for performing abortions are mismating and improvement of feedlot efficiency. In nearly all cases, the mother is saved and suffers no ill effects while the young generally perish.

In many cases, there are good medical reasons for terminating pregnancy in term or near term animals with the object of obtaining viable young. These reasons include toxemia of pregnancy, renal disease, cardiovascular diseases, and fractures. Pregnancy may also be interrupted for convenience to study the newborn. Synchronized induction of parturition could also be utilized as a follow-up in a synchronized breeding program. However, prior to this invention, interruption of pregnancy in a term or near term animal and obtaining live young thereby was not often successful.

Induction of labor was attempted in animals by methods successfully utilized with man [see Danforth, D. N. ed.: Textbook of Obstetrics and Gynecology (1966)]. Drugs such as posterior pituitary extract, purified oxytocic principle, ergonovine maleate, and sparteine sulfate that caused smooth muscle contractions were utilized. These drugs were utilized individually and in combination with other drugs such as estrogen and calcium gluconate to no avail.

Amniotic fluid was withdrawn from term and near term animals and replaced with strongly hypertonic solutions, another procedure borrowed from human medicine. This method, too, was unsuccessful for inducing labor and parturition in animals.

SUMMARY OF THE INVENTION

Accordingly, the principal object of this invention is to provide a method for inducing labor and parturition in term or near term animals and to obtain thereby viable young.

This principal object as well as other objects are attained, according to this invention, by the method of inducing labor and parturition in term and near term animals which comprises treating the animals with a labor and parturition inducing quantity of a corticosteroid, more specifically a fluorinated methylprednisolone.

This method has particular utility in obtaining viable young from term or near term animals suffering from disease or fractures. This method is also useful as an adjunct to a synchronized breeding program and can be utilized in studies of the newborn.

DESCRIPTION OF THE PREFERRED EMBODIMENTS

The novel method of inducing labor and parturition in term and near term animals of this invention comprises treating the animals with a labor and parturition inducing quantity of a corticosteroid, more specifically, a fluorinated methylprednisolone.

This method of inducing labor and parturition is broadly applicable to term and near term mammals. The method is particularly effective with term and near term cattle, horses, sheep, hogs, rabbits, dogs and cats. As used herein, a term animal is a pregnant animal that has reached the end of the normal gestation period for that species. A near term animal is a pregnant animal that is nearing the end of the normal gestation period for that species. Generally, the animal has been pregnant for at least 75 percent of the normal gestation period and, preferably, the animal has been pregnant for at least 85 percent of the normal gestation period.

The term or near term animals are treated, according to this invention, with a corticosteroid, more specifically, a fluorinated methylprednisolone. Specific fluorinated methylprednisolones useful herein are 9-alpha-fluoro-16-alpha-methyl-prednisolone and 6-alpha, 9-alpha-difluoro-16-alpha-methyl-prednisolone. The preferred corticosteroid for use herein is 9-alpha-fluoro-16-alpha-methylprednisolone.

The method of treatment does not appear to be critical as the corticosteroid can be injected intramuscularly or intraveneously or it can be administered orally. Intramuscular injection is the preferred mode of treatment primarily because it is the most simple and most efficient mode.

The corticosteroid can be administered orally in tablet or liquid form and is, of course, administered intramuscularly and intraveneously in liquid form. Carriers and diluents known generally in this field can be utilized with these corticosteroids in treating term and near term animals.

One solution suitable for intramuscular injection containing 9-alpha-fluoro-16-alpha-methylprednisolone is Azium Solution manufactured by Schering Corporation. Each cubic centimeter of Azium contains 2 milligrams of 9-alpha-fluoro-16-alpha-methylprednisolone. The carrier or diluent is comprised of 500 milligrams polyethylene glycol 400, 9 milligrams benzyl alcohol, 1.8 milligrams methylparaben and 0.2 milligram polyparaben as preservatives, 0.5 cubic centimeter of alcohol and sufficient water for injection. The pH of the solution is between 3 and 5.

Another commercial solution suitable for use in this invention and containing 6-alpha, 9-alpha-difluoro-16-alphamethylprednisolone is Slumenthason manufactured by Syntex Corporation.

The term and near term animals are treated, as above described, with a fluorinated methylprednisolone in amounts sufficient to induce labor and, ultimately, parturition. The amounts of fluorinated methylprednisolone administered to each animal is primarily dependent on the weight of the animal. Larger animals require a larger dose of the corticosteroid to induce labor and parturition than do smaller animals.

Dosages of 9-alpha-fluoro-16-alpha-methylprednisolone and 6-alpha, 9-alpha-difluoro-16-alpha-methylprednisolone which can be utilized with some common species to induce labor and parturition are as follows:

|  | Milligrams |
|---|---|
| Cattle | 5 to 20 |
| Horses | 10 to 35 |
| Sheep | 10 to 20 |
| Cats | 0.125 to 0.5 |
| Dogs | 0.25 to 1 |
| Rabbits | 1 to 2 |
| Hogs | 10 to 20 |

It is preferred that dosages larger than the above not be used in this process. In a few cases, when larger than recommended dosages have been utilized, the young have been adversely affected. Smaller dosages can be utilized although if the dosage level is too small, labor and parturition will not be induced in these term and near term animals.

After treatment of term or near term animals with 9-alpha-fluoro-16-alpha-methylprednisolone or other fluorinated methylprednisolone, signs of imminent parturition are generally observable within a short time. These signs can include swelling of the vulva and relaxation of the perineal region, filling of the breasts or udders and milk dripping from the teats. Labor then begins and parturition is usually complete shortly thereafter.

In most cases, the young are viable and not impaired in any way. If parturition is induced too early in the gestation period, the young may be notably premature and may perish if not given special treatment. Of course, this is true of all premature animals.

Generally, there are no adverse effects on the mother after treatment with one of the fluorinated methylprednisolones of this invention. Most species do not require any extra or abnormal treatment after parturition. The normal reproductive cycle is not affected and no adverse reaction to the drug is noticeable.

In cattle, however, the fetal membrane is sometimes retained after parturition by the above described method. When the fetal membrane is retained, the cattle may suffer from purulent metritis or related disorders. Therefore, after inducing parturition in cattle by this method, the uterus should be locally treated immediately.

The local uterine treatment should be an infusion of between 200 cc. and about 1000 cc. of an aqueous antibiotic solution. The antibiotic solution should be comparable to 1 to 2 grams of oxytetracycline in 500 cc. of normal saline. This infusion is normally given on the first, third and fifth post partum days.

A systemic injection of an antibiotic is recommended when and if the cow shows a generalized reaction to the decomposing fetal membranes. Manual removal of the retained fetal membranes is discouraged. These membranes will be passed without help in 7 to 10 days post partum.

EXAMPLES

The following examples illustrate specific preferred embodiments of the above described invention and are not intended to be limiting.

Example I

Twenty-two term or near term cows (Holstein-Friesian) were treated according to the method of this invention. The normal gestation period for these cattle is 278 to 282 days.

The table in column 4 identifies the cows by number; indicates the day of pregnancy at time of treatment; the hours from treatment to parturition; and the dosage of 9-alpha-fluoro - 16 - alpha-methylprednisolone. Whether or not the calf was alive at birth is indicated in the last column.

The 9-alpha-fluoro-16-alpha-methylprednisolone was injected intramuscularly in all of the cows.

Nineteen of the 22 cows in the experiment had a typical induction pattern, with parturition occurring between 22 and 56 hours after treatment with 9-alpha-fluoro-16-alpha-methylprednisolone. The average time was 45 hours and the median time was 47 hours. All of the cows, after the first day had signs of imminent parturition including swelling of the vulva and relaxation of the perineal region, udder filling, and milk dripping from the teats.

Included in the 5 cows that were less than 260 days pregnant (Cows 14, 17, 18, 19 and 20) were 3 cows in which parturition was not induced. These 3 cows all had vulvar swelling, udder filling, and dripping of milk 24 to 48 hours after injection of 9-alpha-fluoro-16-alpha-methylprednisolone. At the time, these cows seemed to be following the usual pattern and appeared ready to calve in the next few hours. However, they settled down and carried their calves nearly to their term dates, respectively, 36, 27 and 10 days later.

Two cows (Cows 9 and 16) were treated with less than 20 mg. of 9-alpha-fluoro - 16 - alpha-methylprednisolone.

| Cow No. | Day of pregnancy | Hours from treatment to parturition | Initial treatment in mg. | Calf |
|---|---|---|---|---|
| 1 | 276 | 36 | 20 | Live. |
| 2 | 262 | 30 | 20 | Live; died in 6 days. |
| 3 | 273 | 56 | 20 | Live. |
| 4 | 272 | 40 | 20 | Live; died in 3 days. |
| 5 | 277 | 56 | 20 | Live. |
| 6 | 277 | 56 | 20 | Live; died during delivery. |
| 7 | 265 | 50 | 20 | Live; died in 2 days. |
| 8 | 265 | 50 | 20 | Live. |
| 9 | 270 | 47 | 16 | Do. |
| 10 | 270 | 30 | 20 | Do. |
| 11 | 268 | 43 | 20 | Premature twins; 1 died in 1 day, 1 died in 14 days. |
| 12 | 263 | 40 | 20 | Live twins. |
| 13 | 277 | 50 | 20 | Live. |
| 14 | 250 | 50 | 20 | Premature live. |
| 15 | 280 | 22 | 20 | Live. |
| 16 | 270 | 40 | 10 | Do. |
| 17 | 255 | 56 | 20 | Premature live, died in 3 days. |
| 18 | 235 | 36[1] | 20 | Live. |
| 19 | 249 | 27[1] | 20 | Stillborn. |
| 20 | 257 | 10[1] | 20 | Live. |
| 21 | 280 | 42 | 20 | Do. |
| 22 | 267 | 54 | 20 | Do. |

[1] Days.

These cows had the same induction pattern as the rest, that is parturition occurred in less than 56 hours.

Retained fetal membranes and subsequent purulent metritis sometimes present problems in cows treated by the method of this invention unless an immediate post partum course of local treatment to the uterus is performed. Local uterine treatment used herein was an infusion of 500 cc. of normal saline containing 1 gram of oxytetracycline on the first, third and fifth post partum days. The fetal membranes were passed in seven to ten days.

All 24 calves appeared normal at bith except for prematurity in a few of them. All but 1 were alive at birth, and all but 8 lived to be sold for veal. Diarrhea in the first two weeks of life and prematurity was responsible for calf losses. The premature calves did not stand or suck properly. These calves slept constantly and did not maintain normal body temperatures. No attempt was made to set up incubators or special care facilities for the calves.

Example II

Ten near term sheep were treated according to the method of this invention. The normal gestation period for these sheep is about 150 days.

Ten milligrams of 9-alpha-fluoro-16-alpha-methylprednisolone was injected intramuscularly in each of the near term sheep. The average length of pregnancy in these sheep was 141 days.

All of the sheep had a typical induction pattern with parturition occurring, on an average, about 48 hours after injection. All of the lambs were born alive and appeared nomal in all aspects. None of the sheep experienced any post partum complications.

Example III

Eleven near term rabbits were treated according to the method of this invention. The normal gestation period for these rabbits is 32 days.

One to two milligrams of 9-alpha-fluoro-16-alpha-methylprednisolone was injected intramuscularly in each of the near term rabbits. The date of injection and the date of parturition are detailed below.

| Rabbit number | Day of pregnancy | Day of parturition |
| --- | --- | --- |
| 1 | 26 | 29 |
| 2 | 26 | 29 |
| 3 | 26 | 29 |
| 4 | 27 | 29 |
| 5 | 27 | 29 |
| 6 | 27 | 29 |
| 7 | 27 | 30 |
| 8 | 27 | 30 |
| 9 | 27 | 30 |
| 10 | 28 | 31 |
| 11 | 29 | 31 |

All of the young were born alive and were normal in all aspects. No post partum complications in the mothers were noted.

Results substantially similar to those recorded above are obtained when 6-alpha, 9-alpha-difluoro-16-alpha-methylprednisolone is substituted for 9-alpha-fluoro-16-alpha-methylprednisolone in approximately the same quantities. Like results are achieved when this method is utilized with term or near term horses, hogs, dogs and cats. Similar results also are obtained when the animals are treated intravenously or orally.

I claim:

1. A method of inducing labor and parturition, with signs of imminent parturition generally observable within a short time, in term or near term pregnant female sheep that have, respectively, either reached or are nearing the end of their normal gestation period of about 150 days, to obtain viable young which comprises administering thereto not more than an effective labor and parturition inducing quantity of a fluorinated methylprednisolone, said observable signs after treatment including swelling of the vulva, relaxation of the perineal region, filling of the udders, and milk dripping from the teats, parturition occurring, on an average, about 48 hours after treatment.

2. The method of claim 1 wherein said fluorinated methylprednisolone is selected from the group consisting of 9-alpha-fluoro-16-alpha-methylprednisolone and 6-alpha, 9-alpha-difluoro-16-alpha-methylprednisolone.

3. The method of claim 2 wherein the sheep are treated by intramuscular injection, intravenous injection, or oral administration.

4. The method of claim 3 wherein labor and parturition are induced by treating the sheep with from about 10 to about 20 milligrams of said fluorinated methylprednisolone.

References Cited

Tucker, H. A. et al.: J. Dairy Sci. 48: 403–405 (1965), "Induction of Lactation in Pregnant Heifers with 9-Fluoroprednisolone Acetate."

Van Rensburg, S. J.: J. Endocr. 38: 83–84 (1967), "Gestation in Sheep After Foetal Adrenalectomy and Cortisol Acetate Administration."

Adams, W. M.: J. Am. Vet. Med. Ass'n 154(3): 261–265, Feb. 1, 1969, "The Elective Induction of Labor and Parturition in Cattle."

SHEP K. ROSE, Primary Examiner